INVENTOR
JOHN A WILLETT

United States Patent Office 3,597,293
Patented Aug. 3, 1971

3,597,293
METHOD OF MAKING LAMINATED MOLDED RESINOUS PRINTING PLATES
John A. Willett, Wellesley, Mass., assignor to W. R. Grace & Co., Cambridge, Mass.
Continuation-in-part of application Ser. No. 573,636, Aug. 19, 1966. This application Oct. 8, 1969, Ser. No. 864,857
Int. Cl. B29c 19/00
U.S. Cl. 156—245                                3 Claims

ABSTRACT OF THE DISCLOSURE

Printing plates exhibiting minimal thermal shrinkage are made by molding a laminar printing plate blank against a matrix. The working face (the top lamination) contains carbon black or a conductive substance, and is substantially thinner than the supporting lamination usually formed of the same resin but containing no conductive substance. Molding preferably takes place in a chamber at reduced atmospheric pressure. Heating is accomplished by high frequency electric current. Since only the face can be heated in the dielectric field and the thicker base remains cool, shrinkage is greatly reduced.

---

Figure 1:
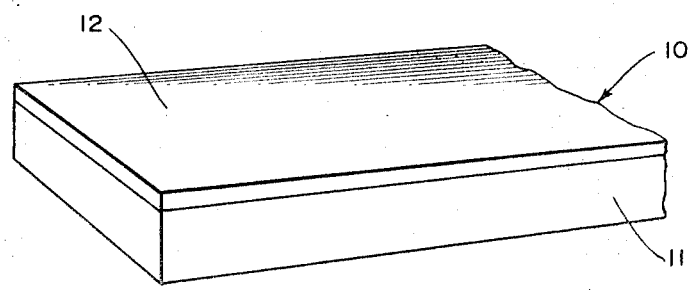

This application a continuation-in-part of my application, Ser. No. 573,636, filed Aug. 19, 1966, now U.S. Pat. 3,553,071.

Plastic substances, both of the thermoplastic and thermosetting variety, shrink to significant degrees as they cool following the molding process.

In the manufacture of mechanical goods, one can easily compensate for shrinkage by proper mold design and dimensions. But when the exact volume to be molded is unknown, and that volume changes from piece to piece, shrinkage can lead to unsatisfactory results.

The problem is compounded in the manufacture of printing plates, for whether they be rigid thermoset book plates or resilient and rubbery for use in a flexographic printing process, the actual volume of the material which has flowed and has molded varies from plate to plate. The ratio of working surface, i.e. the inking face to the white spaces, is quite different for exvery plate that is produced. Obviously it is impossible to calculate for each plate the dimension increase which should be allowed to compensate for shrinkage. The result is that in the manufacture of plates from plastic substances, vertical shrinkage may become serious enough to affect the uniform intensity of the ink or color on the printed page, and horizontal shrinkage can become serious enough to make color registration unsatisfactory.

To avoid these difficulties, many expedients have been proposed in past years. One of the common expedients was to incorporate materials designed to reduce thermal shrinkage in the resin. But none of the practices, so far as I am aware, have produced truly satisfactory results.

It is an object of this invention to control the shrinkage of printing plates molded from plastic materials, and a further object to expedite the molding process greatly by making it unnecessary to heat and flow any large mass of the resin.

The improved process of molding is carried out by providing a laminated sheet, the face layer of which contains conductive material, and so may be heated in a high frequency field. The supporting layer, however, contains no conductive material and is heated by the high frequency only to a negligible amount. As a result, to a large degree the stable dimensions of the backing are imparted to the printing face, and shrinkage is well controlled.

In carrying out my invention, I produce the sheet which will heave type characters, line cuts, or halftones molded on its face by laminating a plastic facing containing a high proportion of a conductive substance to one or more base lamination in which the conductive substance is absent. In a number of instances, the base lamination is formed of the same resin, loaded however with a high charge of inorganic material, e.g. fine silica sand or silex.

The sheet is cured between the platens of a press, each platen of which forms the electrode of a high frequency heating circuit. As is commonly the case, the laminated sheet is laid on a matrix usually formed from a thermoset resinous mass.

FIG. 1 of the accompanying drawing is an enlarged perspective through the laminated plate-forming material.

Figure 2:
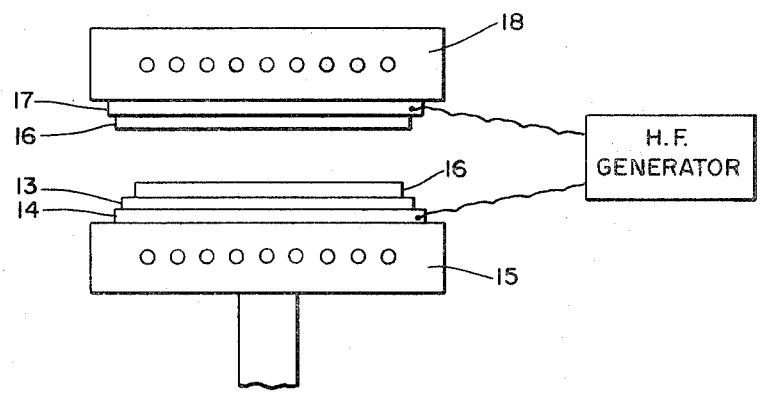

FIG. 2 is a diagrammatic representation of the molding operation.

Referring to FIG. 1, the printing plate material, 10, comprises a supporting lamination or layer, 11, formed of a moldable plastic substance. Many of the well-known resins can be used, but I prefer to use plasticized polyvinyl chloride.

The support layer, 11, may be a single thickness, or a stack of several sheets may be used. The layer, 11, may be formed of unfilled polymeric material, or it may have a considerable loading of a filling substance which has a high dielectric value. Powdered glass and fine silica sand are excellent examples of such materials, and loading contributes to the dimensional stability of the base.

On top of the lamination, 11, I place a thin layer, 12, of the same resin, compounded, however, with a substantial quantity of a material which causes heating of the layer when the plate-making material is placed in a dielectric field. Powdered metal, certain salts, and organic compounds absorb energy and heat the resinous mass quickly, and are operative in this process, but I prefer to use carbon black, particularly thermal furnace carbon blacks having particle sizes of from 400–470 millimicrons as measured by the electron microscope, and which possess oil absorption values of approximately 35% by weight of the carbon.

The amount of the energy absorbing material can be varied through wide limits. It has an insignificant effect if the proportion of carbon black to resin is less than 2%, but causes difficulty in compounding makes a product which may be too brittle if the proportion of carbon exceeds 50% by weight of the resin. The preferred ranges lie between 10 and 20% of carbon black uniformly distributed in the thin surface layer, 12.

In standard type, the height of the letters above the shoulder is approximately 0.022 of an inch. It is not necessary for the surface layer to be much thicker than this, but in practice, to allow for plate routing, a surface layer, 12, of approximately 0.050 inch is used. It is recommended, however, because it holds shrinkage to a minimum, that the thickness of the layer be merely sufficient to provide all material necessary to fill all of the depressions of the female image in the mold or matrix.

In the following example, polyvinyl chloride pastes are used. As will be understood from the past discussion, milled rubbers and their elastomer analogues and thermosetting resins which are advanced to the so-called B stage, but not yet have been advanced to their infusible condition, are equally suitable. The methods of compounding, sheeting, and laminating such materials are well understood and need not here be set forth by specific examples.

EXAMPLE I

Support layer: Parts
- Polyvinyl chloride, paste grade _____ 100
- Polyester plasticizer _____ 100
- Curing agent _____ 10
- White pigment (tatanium dioxide and whiting) _ 8

These materials were thoroughly milled in an edge-running mill until a smooth paste was formed. After milling, the paste was placed in molds of 7 x 11 inches, and gelled or "fluxed" by heating the material in the mold to 325° F. for 2 minutes.

Surface layer: Parts
- Polyvinyl chloride, paste grade _____ 100
- Polyester plasticizer _____ 50
- Curing agent _____ 10
- Carbon black _____ 10

These materials were ground in an edge-running mill until a smooth paste was formed. When the paste was complete, sufficient paste was poured into the same mold which contained the gelled base composition to form a layer 0.050 inch in thickness.

The combined layers in the mold were heated to 325° F. for 2 minutes which "fluxed" the carbon-black loaded paste and caused it to adhere as a layer, 12, to the layer, 11. When the mold had cooled, the gelled material was removed and laid upon an already-molded matrix board with the thin layer carbon-filled face, 12, lying against the open face of the matrix.

As is diagrammatically indicated in FIG. 2, the laminated plate-forming material, 10, is shown placed on an already-molded matrix board, 13. This, in turn, is laid on the lower electrode, 14, supported by the lower platen, 15, of a press. Both platens are water cooled.

The upper electrode, 16, is attached to insulating material, 17, which in turn is attached to the upper platen, 18, of the press. The electrodes are energized by the high frequency generator, 19.

In molding, the press is closed to bring the upper electrode, 16, into contact with the "conductive" upper lamination, 12. The circuit is energized for a time sufficient to bring the lamination to molding temperature, and the press then is closed under full pressure.

A preferred form of plate molding apparatus is disclosed in my application, Ser. No. 573,638, filed Aug. 19, 1966, which is herein incorporated by reference. It is understood, however, that plates may be made in a conventional platen press arranged for dielectric heating as described.

The apparatus described in the above-identified application molds the printing plate in a chamber from which the air has been largely removed before any flow or molding of the resin takes place. This assures that surface defects in the printing plate will not be caused by trapped air, as often happens if resins are molded against "closed letters." In such cases the air which is enclosed by the wall of type expands and causes a broken letter or a blurred surface defect. When air is removed prior to the molding operation, these defects do not occur. Essentially this is brought about by a compressible wall of gasketing material which extends around at least one of the platens and then closing the platens of the press only sufficiently to bring the top platen into light contact with the plate and form a sealed chamber enclosing the plate by contact of the wall surrounding the upper platen with the gasketing material which surrounds the walls of the lower platen.

With the unmolded sheet, 10, face down on the matrix board, the assembly is laid on the bottom platen.

The press is then closed, air is exhausted from the enclosure, and the high frequency electrical circuit is energized for a pre-determined length of time—usually 10 seconds.

In ordinary circumstances, the current is switched off at the moment that the moldable face has reached the proper viscosity. Then the full pressure of the press is exerted on the sandwich. When the current is cut off and the press is closed at full-ram pressure, it brings up against bears which, as in conventional open molding practice, determine the final thickness of the sheet.

Since both platens of the press are water cooled, chilling begins at once. The material, made rigid by chilling, can be removed from the press and matrix within 1 minute.

The ground glass, silica sand, or silex loading of the support layer, beside its function in aiding the dimensional control of the supporting lamination, 11, makes grinding the plate to give it an absolutely flat back and predetermined thickness a much easier operation. The presence of such filling materials prevents the grinding wheel from "loading," and greatly reduces the tendency of friction-melted resin to be dragged across the freshly ground face.

A variety of inductive heating machines or dielectric heating machines operating in the megacycle range may be used. These are commercial and well-known pieces of equipment and need not be further described. If the proportion of carbon black or other conductive material in the top lamination is significant (about 10% and above), inductive heating is possible at frequencies of 450,000 Hz. Higher frequencies will increase the speed of heating. Tests were conducted, using various commercial machines including the Lepel inductive heating device, operating at 45 kHz., with an energy input of 2–2½ kw.

The characteristic advantage of this process is that the printing plate material is only that amount of material which must be melt-flowed into position to form the type face, and that is very small. The molded mass is securely anchored to the base. The base, 11, does not heat to any material degree and so suffers very slight thermal dimensional change. Shrinkage problems both vertical and horizontal, accordingly, are greatly reduced. Examination of the printed image formed by such plates will show improved definition of even such small areas as a high-light dot, and better registration of color plates.

Although the manufacturing of printing plates has been put forward as the preferred example, it follows that resinous moldings requiring the maximum accuracy in surface definitions are included within the scope of this invention.

What is claimed is:

1. The process of molding resinous printing plates and controlling the thermal shrinkage after molding comprising forming a laminated blank sheet having an electrically conductive face layer and at least one electrically nonconductive support layer, placing the face of the face layer in contact with a printing matrix bearing intaglio reproduction of printing indicia, inserting the so-formed sandwich in a press having platens each of which carries an electrode of a high frequency heating circuit, continuously cooling the press platens to keep the support layer relatively cool and limit shrinkage of the face layer establishing a high frequency field between the platens thereby raising only the face layer to a flowable temperature, closing the press to force the face layer material into full contact with the matrix, opening the press and removing the plate with the indicia molding in the conductive face layer, whereby the cold support layer remains relatively cool and limits shrinkage of the molded face layer.

2. The process of claim 1 wherein the electrically conductive layer comprises resin and from 10–20% of furnace black, and wherein the nonconductive layer comprises resin and a substantially nonconductive siliceous filler.

3. The process of claim 1 wherein, prior to the molding, air is exhausted from the vicinity of the molding surface.

References Cited

UNITED STATES PATENTS

| | | | |
|---|---|---|---|
| 3,197,352 | 7/1965 | Coates | 156—242 |
| 3,318,758 | 5/1967 | Tell | 156—272X |
| 3,417,459 | 12/1968 | Pomerantz et al. | 156—272X |

BENJAMIN R. PADGETT, Primary Examiner

S. J. LECHERT, Jr., Assistant Examiner